United States Patent
Sun et al.

(10) Patent No.: US 8,411,256 B2
(45) Date of Patent: Apr. 2, 2013

(54) DISTANCE MEASURING APPARATUS AND CONTROL METHOD THEREOF

(75) Inventors: Kuo-Jui Sun, Taichung (TW); Jen-Hung Wu, Taichung (TW)

(73) Assignee: Asia Optical International Ltd., Tortola (VG)

( * ) Notice: Subject to any disclaimer, the term of this patent is extended or adjusted under 35 U.S.C. 154(b) by 683 days.

(21) Appl. No.: 12/641,648

(22) Filed: Dec. 18, 2009

(65) Prior Publication Data

US 2010/0157279 A1 Jun. 24, 2010

(30) Foreign Application Priority Data

Dec. 22, 2008 (TW) .............................. 97150086A

(51) Int. Cl.
*G01C 3/08* (2006.01)
(52) U.S. Cl. ..................................... 356/4.01; 356/5.01
(58) Field of Classification Search ................. 356/4.01, 356/5.01
See application file for complete search history.

(56) References Cited

U.S. PATENT DOCUMENTS 6,819,407 B2 * 11/2004 Arita et al. .................. 356/4.01
2002/0167654 A1 * 11/2002 Shirai et al. ................. 356/5.01

* cited by examiner

*Primary Examiner* — Mark Hellner
(74) *Attorney, Agent, or Firm* — McClure, Qualey & Rodack, LLP

(57) ABSTRACT

The invention provides a distance measuring apparatus for measuring distance to a target, having: a light emitter for emitting a measuring light; a light receiving system for receiving a reflected light reflected from the target and outputting a sensing signal; a comparator having a reference signal input terminal for receiving a reference signal, a sensing signal input terminal for receiving the sensing signal, and a comparison result signal output terminal for outputting a comparison result signal according to comparison results between the reference signal and the sensing signal; and a process and control module for providing the reference signal to the reference signal input terminal of the comparator and adjusting the reference signal according to the comparison signal.

18 Claims, 4 Drawing Sheets

DISTANCE MEASURING APPARATUS AND CONTROL METHOD THEREOF

CROSS REFERENCE TO RELATED APPLICATION

This Application claims priority of Taiwan Patent Application No. 097150086, filed on Dec. 22, 2008, the entirety of which is incorporated by reference herein.

BACKGROUND OF THE INVENTION

1. Field of the Invention

The invention relates to a distance measuring apparatus, and particularly to a distance measuring apparatus capable of dynamically adjusting a threshold value.

2. Description of the Related Art

In a light receiving system of a conventional rangefinder, a reflected light reflected from the target is converted into an electronic signal (i.e., a voltage or current signal). The electronic signal is then amplified by an amplifying circuit. Finally, a comparator determines whether the received signal is the reflected signal from the target or noise. Particularly, the comparator compares the amplified electronic signal with a reference signal with a predetermined reference value and generates a comparison result, and the comparison result determines whether the received signal is the reflected signal from the target or noise. Generally, the reference signal may be greater than the surrounding noise and less than the reflected signal from the target. Since the reflected signal is greater than the reference signal, the comparator outputs the comparison result with a high-level voltage. On the contrary, the comparator outputs the comparison result with a low-level voltage. When the comparator outputs the comparison result with a high-level voltage, the distance of the target is determined by calculating the time duration counted from a measuring light was emitted to the comparison result with a high-level voltage is outputted. However, the light receiving system of a conventional rangefinder may produce inaccurate results. FIG. 1 shows a signal waveform diagram of a conventional distance measuring apparatus, in which the horizontal and vertical axes are the measuring time and the intensity of the inputted signal, respectively. In FIG. 1, Vth represents the reference signal (for example a voltage), and curve S represents the input signal inputted into the comparator. The comparator outputs the comparison result with a high-level voltage once the input signal is greater than the reference signal, and the distance of the target is determined according to timing when the comparison result with a high-level voltage was outputted. Note that point A is the timing when the comparator outputs the comparison result with a high-level voltage. However, the correct timing should be point B. Thus, the distance result is inaccurate. Specifically, inaccuracies increase, when the target is made of a highly reflective material or the target is close to the distance measuring apparatus. In addition, when the target is made of a low reflective material or the target is far away from the distance measuring apparatus, the comparator does not output the comparison result with a high-level voltage since the input signal would be less than the reference signal; although the input signal is higher than noise. Thus, a distance measuring apparatus with accurate results not affected by material type of a target or distance is desired.

SUMMARY OF THE INVENTION

In light of the previously described, a distance measuring apparatus capable of dynamically adjusting a threshold value is provided.

The invention provides a distance measuring apparatus for measuring distance to a target, comprising: a light emitter for emitting a measuring light; a light receiving system for receiving a reflected light reflected from the target and outputting a sensing signal; a comparator comprising a reference signal input terminal for receiving a reference signal, a sensing signal input terminal for receiving the sensing signal, and a comparison result signal output terminal for outputting a comparison result signal according to comparison results between the reference signal and the sensing signal; and a process and control module for providing the reference signal to the reference signal input terminal of the comparator and adjusting the reference signal according to the comparison signal.

The invention also provides a control method for a distance measuring apparatus for performing distance measurement of a target, wherein the distance measuring apparatus comprises a light emitter, a light receiving system, a comparator and a process and control module, comprising the steps of:

(A) emitting a measuring light to impinge the target, and providing a reference signal;

(B) receiving a reflected light reflected from the target, and generating a sensing signal corresponding to the reflected light; and (C) lowering the reference signal during a predetermined duration.

BRIEF DESCRIPTION OF THE DRAWINGS

The invention can be more fully understood by reading the subsequent detailed description and examples with references made to the accompanying drawings which are given by way of illustration only, and thus are not limitations of the invention, and wherein.

DETAILED DESCRIPTION OF THE INVENTION

Figure 1:
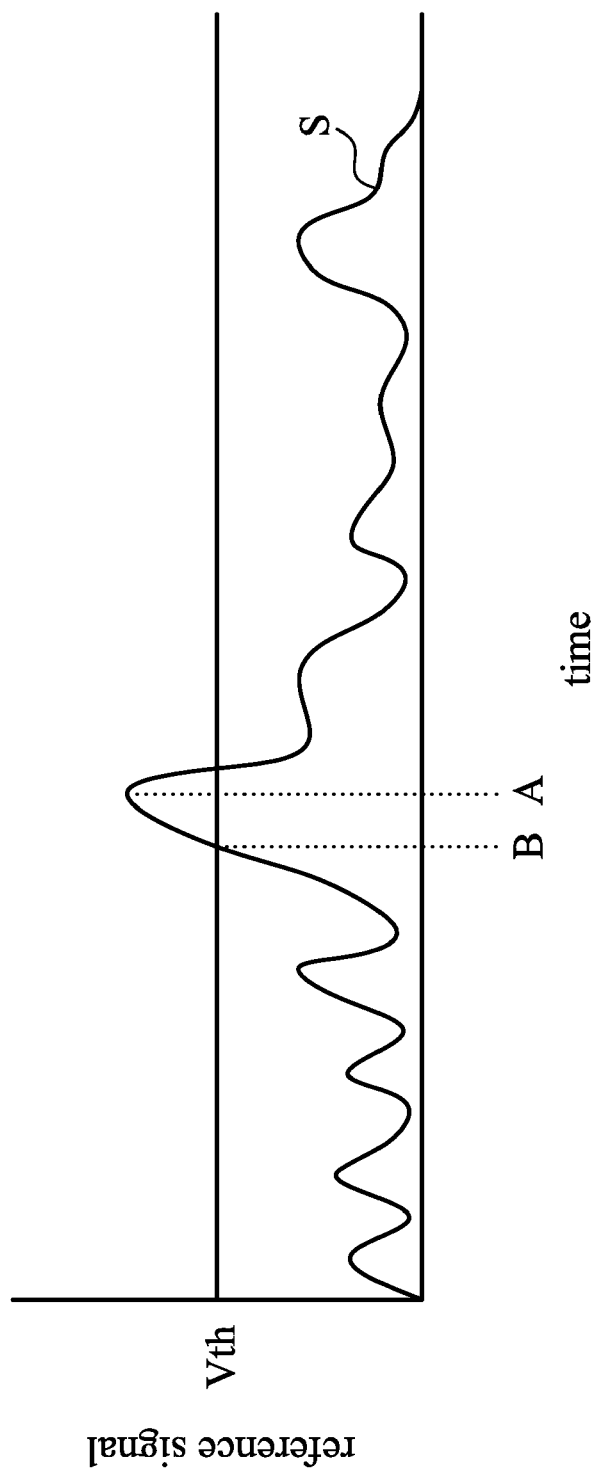
FIG. 1 is a waveform diagram of input signal of the conventional distance measuring apparatus.
Figure 2:
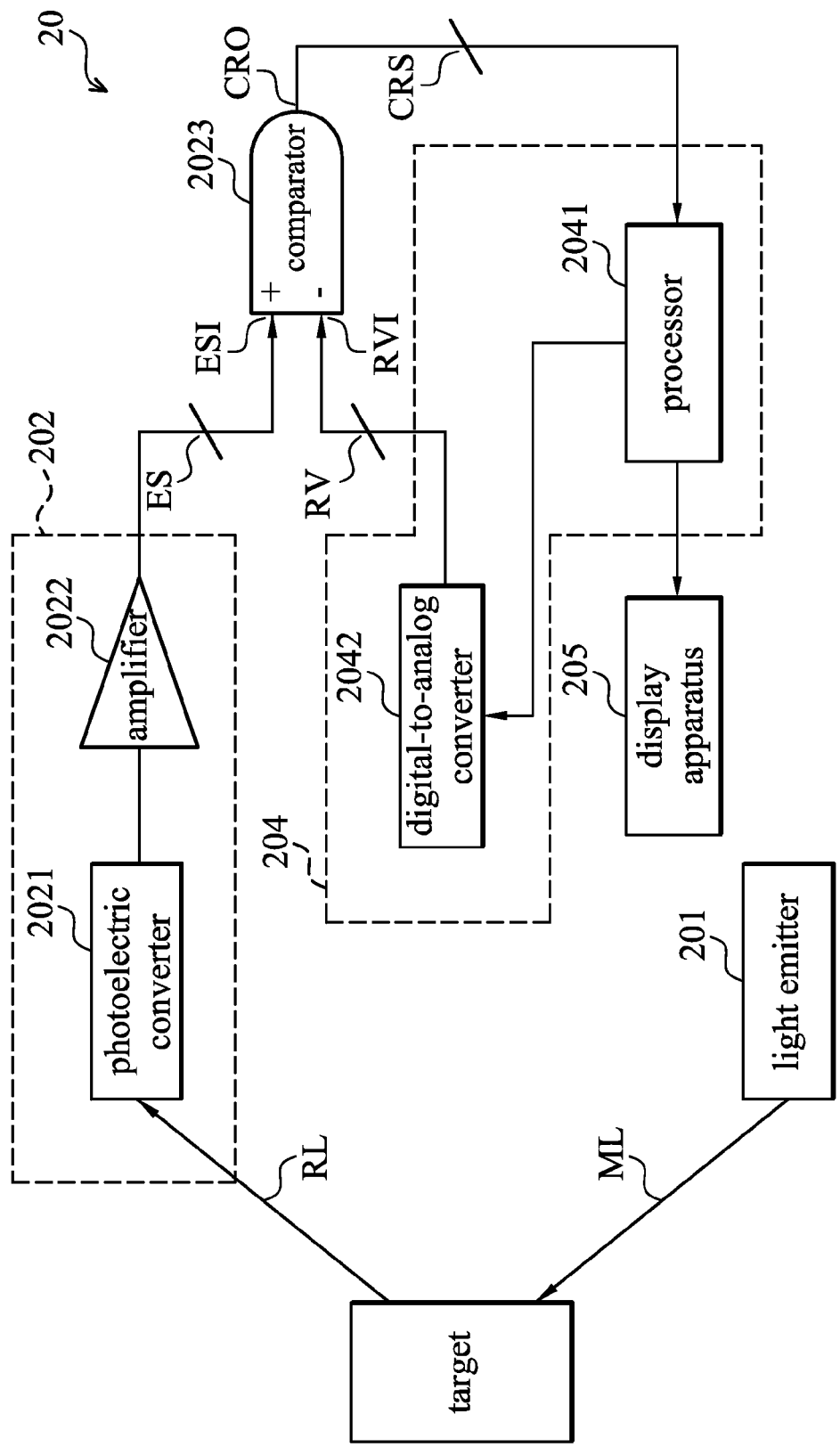
FIG. 2 is a block diagram of a distance measured apparatus according to an embodiment of the invention.

FIG. 2 shows a block diagram of a distance measuring apparatus according to an embodiment of the invention. The distance measuring apparatus 20 comprises a light emitter 201, a light receiving system 202, a comparator 203, a pocesrs and control module 204 and a display apparatus 205.

The light emitter 201 emits a measuring light ML. In the embodiment, the light emitter 201 is a laser diode configured to emit a light signal as the measuring light ML when measuring a distance to the target. When the surface of the target is impinged by the measuring light ML, the measuring light ML is reflected and becomes the reflected light RL.

The light receiving system 202 receives the reflected light RL reflected from the target, and outputs a sensing signal ES corresponding to the reflected light RL to a input terminal of a comparator 203. In the embodiment, the light receiving system 202 further comprises a photoelectric converter 2021 to convert the reflected light RL into an electronic signal, and the amplifier 2022 for amplifying the electronic signal as the sensing signal ES. In the embodiment, the photoelectric converter 2021 may be an avalanche photodiode (APD). When the photoelectric converter 2021 receives the reflected light RL, the photoelectric converter 2021 converts the light signal into the electronic signal, such as current and voltage. Since the electronic signal output from the photoelectric converter 2021 is weak, the amplifier 2022 is configured to amplify the electronic signal and change the electronic signal into the sensing signal ES for the comparator 203 to compare the sensing signal with a reference signal, wherein the sensing signal ES may be current and voltage. In one embodiment, the amplifier 2022 is integrated into the photoelectric converter 2021. Namely, the sensing signal ES is directly output through the internal circuit of the photoelectric converter 2021 after the photoelectric converter 2021 senses the reflected light RL. The comparator 203 comprises a reference signal input terminal RVI configured to receive the reference signal RV, a sensing signal input terminal ESI configured to receive the sensing signal ES and a comparison result signal output terminal CRO configured to output a comparison result signal CRS according to the comparison results between the reference signal RV and the sensing signal ES, wherein the comparison result signal CRS comprises a triggering signal and a non-triggering signal. In the embodiment, the comparator may be an amplifier, wherein the reference signal input terminal RVI is the inverting input terminal (−) and the sensing signal input terminal is the non-inverting input terminal (+). In one embodiment, the comparator may be an integrated circuit (IC) having functions of a comparator. In another embodiment, the comparator 203 may be a comparator unit integrated into the process and control module 204. Additionally, the comparator 203 may be replaced by a voltage comparator or a current comparator according to the sensing signal ES. Therefore, the comparison result signal CRS output by the comparator 203 may be the triggering signal when the reference signal RV on the reference signal input terminal RVI is less than the sensing signal ES on the sensing signal input terminal ESI. On the contrary, the comparison result signal CRS may be the non-triggering signal. In one embodiment, the triggering signal may be a high-level or a low-level voltage signal, and the non-triggering signal may be a low-level or a high-level voltage signal. In the embodiment, the reference signal on the reference signal input terminal RVI is less than the sensing signal ES on the sensing signal input terminal ESI, and therefore the triggering signal is a high-level voltage signal. When the reference signal RV on the reference signal input terminal RVI is less than the sensing signal ES on the sensing signal input terminal ESI, for instance, by exchanging the inputs of the reference signal input terminal RVI and sensing signal input terminal ESI, the triggering signal is determined to be the high-level or low-level voltage signal according to circuit design and program control.

The process and control module 204 provides the reference signal RV to the reference signal input terminal RVI of the comparator 203 and adjusts the reference signal RV according to the comparison result signal CRS. In the embodiment according to invention, the process and control module 204 further comprises a processor 2041 configured to adjust and output a digital signal according to an instruction, and a digital-to-analog converter 2042 to convert the digital signal into an analog signal to serve as the reference signal RV. Specifically, when the process and control module 204 performs the distance measuring operation, the processor 2041 firstly outputs the corresponding digital signal according to instruction, and then the digital-to-analog converter 2042 converts the digital signal into the analog signal. The analog signal is eventually input into the reference signal input terminal RVI of the comparator 203 and serves as the reference signal RV.

It should be noted that the digital signal may be different according to instruction, such that the digital signal may be controlled by instruction. Moreover, the digital-to-analog converter converts the digital signal into the corresponding analog signal and outputs the corresponding analog signal to the reference signal input terminal RVI of the comparator 203, wherein the corresponding analog signal serves as the reference signal. Accordingly, the reference signal RV of the comparator 203 may be adjusted by instruction. In one embodiment, the process and control module 204 may be implemented by an equivalent circuit. In another embodiment, the process and control module 204 may be a microcompute processor (MCU), a central processing unit (CPU), a complex programmable logic device (CPLD), a field programmable gate array (FPGA), or a system on-chip (SOC). In the embodiment according to the invention, the processor may be an MCU. In one embodiment, the processor may be a digital signal processor (DSP), a CPU, a CPLD, a FPGA, or a SOC. In another embodiment, the processor may be an equivalent circuit.

The display apparatus 205 displays the comparison result signal CRS according to signals from the process and control module 204. In the embodiment, the display apparatus may be a liquid crystal display (LCD). In one embodiment, the display apparatus 205 may be a seven segment LED display or a TFT-LCD.

Figure 3:
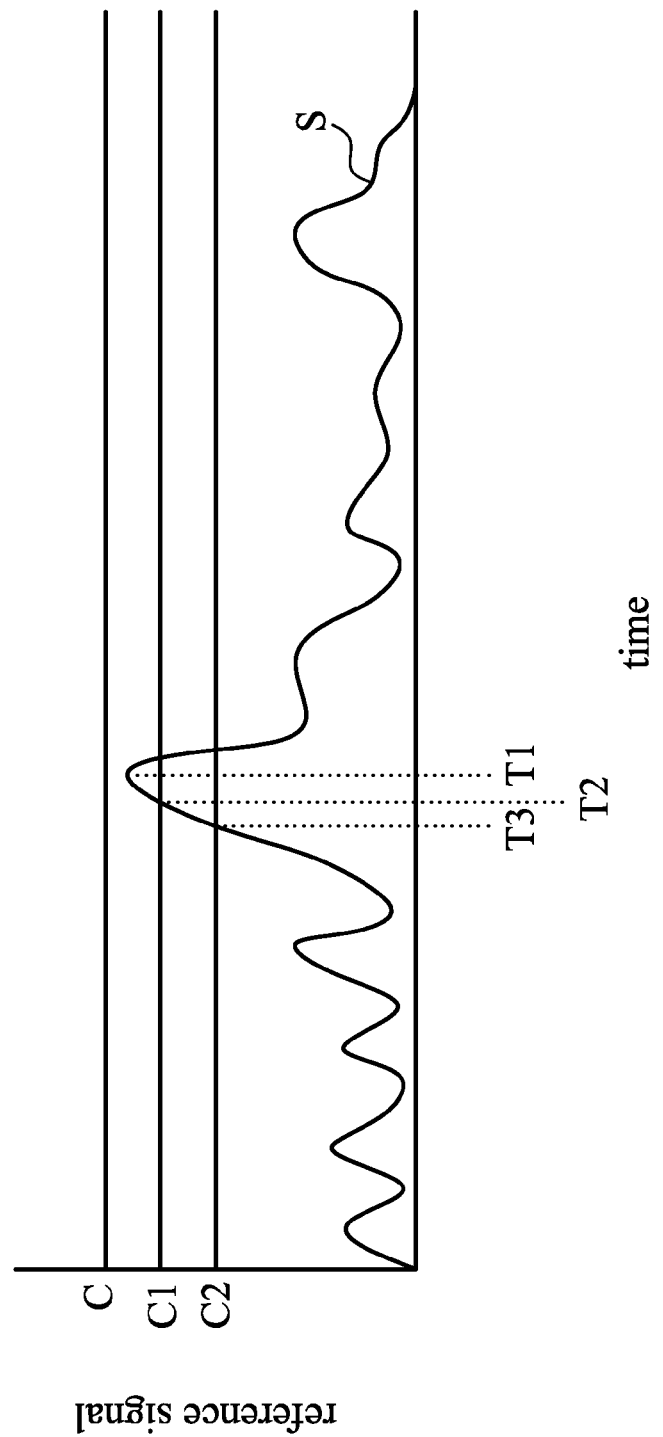
FIG. 3 is a waveform diagram of input signal which illustrates the difference between two different interval values of the process and control module according to the comparator of the invention.

When the distance measuring apparatus 20 is operated, such as a user presses down a measuring button (not shown in FIG. 2), the light emitter 201 controlled by the process and control module 204 emits the measuring light ML, and the process and control module 204 begins a time-counting process. Additionally, the process and control module 204 provides the reference signal RV with a predetermined reference value to the reference signal input terminal RVI of the comparator 203. Meanwhile, the light receiving system 202 continues sensing of the reflected light RL, and generates the sensing signal ES output to the sensing signal input terminal ESI of the comparator 203. In one embodiment, when the distance measuring apparatus 20 is turned on, the process and control module 204 immediately provides the reference signal RV with the predetermined reference value to the comparator 203. When the comparator 203 does not output the high-level voltage signal during a predetermined time duration, the process and control module 204 will lower the reference signal RV sequentially with an alternative value. If the comparator 203 does not output the high-level voltage signal when the reference signal exceeds the predetermined time duration, the process and control module 204 will send an error signal to the display apparatus 205, and the display apparatus displays a corresponding message, such as measuring failure, for users after receiving the error signal. In the embodiment, the predetermined time duration is a time interval that the reference signal is lowered from the predetermined reference value to a predetermined lowest reference value, wherein the predetermined lowest reference value may be the noise signal of the distance measuring apparatus 20. In one embodiment, the predetermined lowest reference value of the reference signal RV may be a fixed ratio of the predetermined reference value. For instance, assuming the fixed ratio is 70% and the predetermined reference value of the reference signal RV is 2V, thus the predetermined lowest reference value of the reference signal RV is 1.4V. It should be noted that the greater the interval value, the lower the accuracy of the distance measuring apparatus 20. FIG. 3 is a comparison diagram illustrating the difference between two different interval values of the process and control module 204 according to the comparator of the invention. FIG. 3 shows the influence of the interval value on accuracy of the distance measuring apparatus 20 when the process and control module 204 is lowering the reference signal by a greater or a smaller interval value. As shown in FIG. 3, the horizontal axis indicates the measuring time, the vertical axis indicates the reference signal, the curve S is the waveform of the sensing signal ES from the sensing signal input terminal ESI of the comparator 203, C represents the predetermined reference value of the reference signal RV, C1 represents a first reference value by lowering the reference signal RV by a first interval value, and C2 represents a second reference value by lowering the reference signal RV by a second interval value, wherein the second interval value is greater than the first interval value. Referring to FIG. 3, the peak of the curve S is generated at the timing T1, hence the distance of the target calculated according to the timing T1 is accurate. Since the predetermined reference value of the predetermined reference signal RV provided to the reference signal input terminal RVI is C, and the value of the sensing signal at the sensing signal input terminal ESI is lower than the predetermined reference value C of the predetermined reference signal RV at the timing T1, then the comparison result signal output terminal CRO of the comparator 203 is not pulled high (i.e., does not output the high-level voltage signal), and the process and control module 204 starts lowering the reference signal RV sequentially by an interval value. Note that if the predetermined reference value of the reference signal RV lowered with a first interval value serves as the first reference value C1, then the comparator 203 outputs the high-level voltage signal at the timing T2 since the value of the sensing signal at the sensing signal input terminal ESI is greater than the value of the first reference value C1. Similarly, if the predetermined reference value of the reference signal RV lowered with a second interval value is serves as the second reference value C2, then the comparator 203 also outputs the high-level voltage signal at the ??? T3 since the value of the sensing signal at the sensing signal input terminal ESI is greater than the second reference value C2. Note that the timing T2 and T3 can be obtained by lowering the predetermined reference value of the reference signal RV with the first and second interval value. If the distances of the target are calculated from the timing T2 and T3, then the distance calculated from the timing T2 is more accurate than the distance calculated from the timing T3. Specifically, if the distance calculated from the timing T1 represents the accurate distance, and the timing T2 is more close to the timing T1 than the timing T3, then the distance calculated form the timing T2 is more closes to the accurate distance represented by the timing T1 than the distance calculated from the timing T3. Moreover, since the first interval value is less than the second interval value, the distance unit is smaller. That is, the precision of the distance measuring is higher.

In addition, in one embodiment according to the invention, the predetermined reference value of the predetermined reference signal RV is determined according to one of the maximal value of the sensing signal ES output from the light receiving system 202 and the value of the sensing signal ES output by a best mode. The best mode means the target is a highly-reflective material and located at a best measuring distance, and thus the light receiving system 202 outputs the sensing signal ES with greatest intensity. In one embodiment, various surrounding noise detections are performed on the distance measuring apparatus 20 to obtain a system noise voltage before leaving the factory. Next, the predetermined reference value of the predetermined reference signal RV is determined according to one of the maximal value of the sensing signal ES output from the light receiving system 202 of the system noise voltage. The predetermined reference value of the reference signal RV may be programmed as an arbitrary reference value between the first and second interval values by users, or be determined by a predetermined ratio of the maximal value of the sensing signal ES. In one embodiment, the surrounding noise detections are performed in advance to obtain the system noise voltage before the distance measuring apparatus is turned on.

Once the reference signal RV is less than the sensing signal input to the sensing signal input terminal ESI (i.e. the sensing signal ES is greater than the reference signal RV), the comparator 203 outputs the triggering signal. Meanwhile, the process and control module 204 receives the triggering signal output from the comparator 203, and records the timing triggering signal to obtain time interval from emitting the measuring light to receiving the triggering signal. Accordingly, the distance of the target is calculated according to the time interval, and is displayed by the display apparatus 205.

In another embodiment according to the invention, the distance measuring apparatus 20 measures distance by scanning That is, the measuring light is emitted continuously and configured to indicate the distance of the target in situ. When the distance measuring apparatus 20 performs the distance measuring operation, such as a user holds a measuring bottom (not shown in FIG. 2), the process and control module 204 automatically and repeatedly performs the distance measuring operation. Similar operations between the previous embodiments and current embodiment will not be described again for brevity. When the comparison result signal output terminal CRO of the comparator 203 does not output the triggering signal with a high-level voltage, the process and control module 204 automatically and repeatedly performs the distance measuring operation within the predetermined time duration. In one embodiment, after the distance measuring apparatus 20 automatically and repeatedly performs the distance measuring operation for a predetermined number of times, the process and control module 204 sends an error signal to the display apparatus 205 to provide the user with information that the distance measuring operation has failed.

A control method for the distance measuring apparatus 20 is disclosed in one embodiment according to the invention. The distance measuring apparatus 20 of a distance measuring apparatus 20 provides accurate results not affected by material type of a target or distance.

Figure 4:
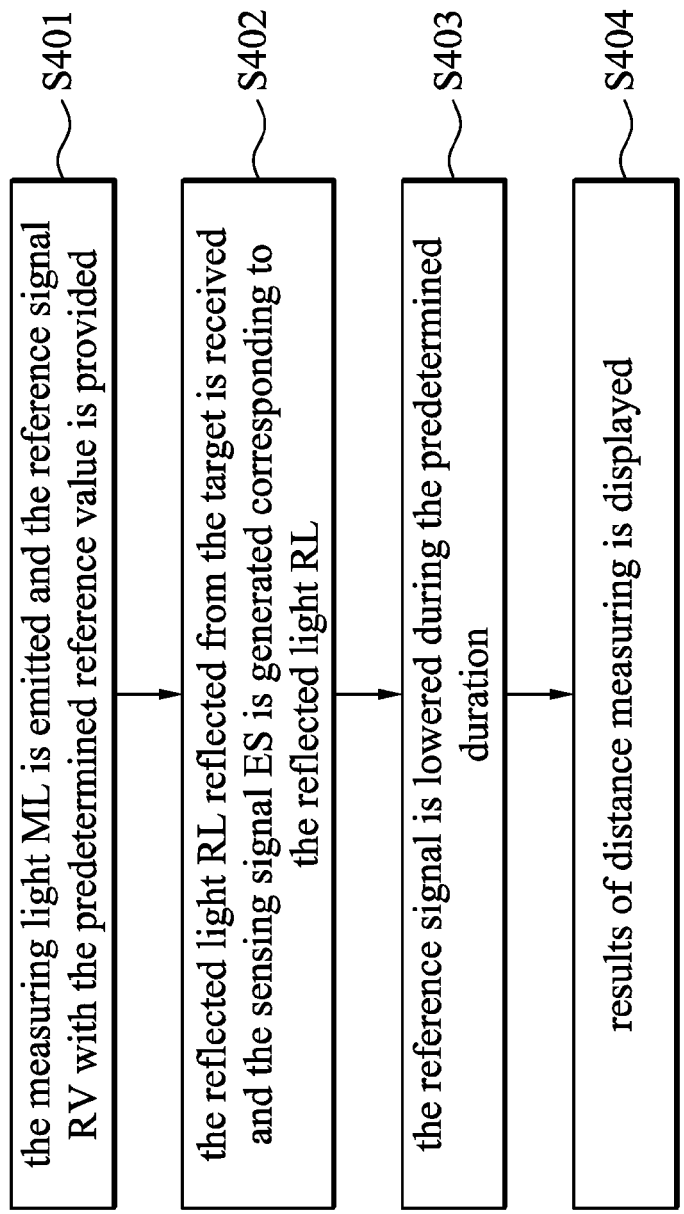
FIG. 4 is a flow chart of control method according to an embodiment of the invention.

FIG. 4 shows the flow chart of a control method in one embodiment according to the invention, wherein a distance measuring operation is performed by a distance measuring apparatus 20 of according to the invention.

For the control method for the distance measuring apparatus 20 for one embodiment according to the invention, the distance measuring apparatus 20 comprises a light emitter 201, a light receiving system 202, a comparator 203, and a process and control module 204. The control method comprises the following steps for measuring a distance to a target by the distance measuring apparatus 20 of the invention.

In STEP S401, the measuring light ML is emitted and the reference signal RV with the predetermined reference value is provided to the comparator 203. In STEP S401, the light emitter 201 emits the measuring light ML. Concurrently, the process and control module 204 starts to count time, and provides the reference signal RV with the predetermined reference value to the reference signal input terminal RVI of the comparator 203.

In STEP S402, the reflected light RL reflected from the target is received and the sensing signal ES is generated corresponding to the reflected light RL. In STEP S402, the light receiving system 202 receives the reflected light RL reflected from the target and outputs the sensing signal ES corresponding to the intensity of the reflected light RL to the sensing signal input terminal ESI of the comparator 203. The comparator 203 compares the sensing signal ES with the reference signal RV, and outputs the comparison result signal CRS to the process and control module 204 according to the comparison results. The procedure of the control method advances to STEP S404 when the sensing signal ES is higher than the reference signal RV.

In STEP S403, the reference signal is lowered during the predetermined time duration. In STEP S403, the process and control module 204 lowers the predetermined reference value of the predetermined reference signal RV to the predetermined lowest value of the reference signal RV until the value of the reference signal is less than the value of the sensing signal ES or exceeds the predetermination time duration.

In STEP S404, results of the distance measurement is displayed. In STEP S404, the process and control module 204 generates a time interval counted from the sending of the measuring light to the sensing signal being greater than the reference signal, and calculates the distance of the target according to the time interval, and eventually shows the distance on the display apparatus 205. When the comparator 203 does not output the high-level voltage signal when the reference signal exceeds a predetermined time duration, the process and control module 204 will send an error signal to the display apparatus 205 and the display apparatus will display a message, such as measuring failure, for the user, after receiving the error signal.

The invention provides a distance measuring apparatus and a control method thereof, wherein accurate results not affected by material type of a target or distance is achieved. Specifically, the distance of a target is precisely measured by dynamically adjusting the reference signal input into the reference signal input terminal of the comparator, wherein the value of the sensing signal is within a predetermined range of the reference signal. Additionally, the interval value may also be used for adjustment.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A distance measuring apparatus for measuring distance to a target, comprising:
   a light emitter for emitting a measuring light;
   a light receiving system for receiving a reflected light reflected from the target and outputting a sensing signal;
   a comparator comprising a reference signal input terminal for receiving a reference signal, a sensing signal input terminal for receiving the sensing signal, and a comparison result signal output terminal for outputting a comparison result signal according to comparison results between the reference signal and the sensing signal, wherein the comparison result signal comprises a triggering signal and a non-triggering signal; and
   a process and control module for providing the reference signal to the reference signal input terminal of the comparator and adjusting the reference signal according to the comparison signal.

2. The distance measuring apparatus as claimed in claim 1, wherein the light receiving system comprises:
   a photoelectric converter for converting the reflected light into an electronic signal; and
   an amplifier for amplifying the electronic signal to serve as the sensing signal.

3. The distance measuring apparatus as claimed in claim 1, wherein the process and control module further lowers the reference signal when the comparator does not output the triggering signal during a predetermined time duration.

4. The distance measuring apparatus as claimed in claim 3, wherein the process and control module further lowers the reference signal sequentially by an interval value.

5. The distance measuring apparatus as claimed in claim 4, wherein the process and control module further stops lowering the reference signal after the comparator outputs the triggering signal.

6. The distance measuring apparatus as claimed in claim 3, wherein the process and control module further sends an error signal when the comparator does not output the triggering signal when time exceeds a predetermined time duration.

7. The distance measuring apparatus as claimed in claim 6, further comprising a display apparatus configured to display an error message corresponding to the error signal.

8. The distance measuring apparatus as claimed in claim 1, wherein the process and control module comprises:
   a processor for adjusting and outputting a digital signal according to an instruction; and
   a digital-to-analog converter to convert the digital signal into an analog signal to serve as the reference signal.

9. The distance measuring apparatus as claimed in claim 4, wherein the process and control module further performs the distance measuring operation automatically and repeatedly in a scanning mode when the comparator does not output the triggering signal during the predetermined duration.

10. The distance measuring apparatus as claimed in claim 1, wherein the comparator is a current comparator or a voltage comparator.

11. A control method for a distance measuring apparatus for performing distance measurement of a target, wherein the distance measuring apparatus comprises a light emitter, a light receiving system, a comparator and a process and control module, comprising the steps of:
   (A) emitting a measuring light to impinge the target, and providing a reference signal;
   (B) receiving a reflected light reflected from the target, and generating a sensing signal corresponding to the reflected light; and
   (C) lowering the reference signal during a predetermined duration, and lowering the reference signal sequentially by an interval value when the reference signal is lower than the sensing signal.

12. The control method as claimed in claim 11, further comprising a step (D) displaying results of the distance measured.

13. The control method as claimed in claim 12, wherein the distance measuring apparatus further comprises the display apparatus, and the step (D) further comprises the steps of:
   calculating a distance of the target, by the process and control module, according to a time interval counted from sending of the measuring light to the sensing signal being greater than the reference signal and generating a comparison result signal, and displaying the distance in the display apparatus.

14. The control method as claimed in claim 12, wherein the distance measuring apparatus further comprises a display apparatus, and the step (D) further comprises the steps of:

sending an error signal, by the process and control module, to a display apparatus when the comparator not outputting a comparison result signal resulted from the sensing signal being greater than the reference signal when the reference signal exceeds a predetermined time duration, and the display apparatus displaying a corresponding message according to the error signal.

15. The control method as claimed in claim 11, wherein the step (A) further comprises the steps of:

controlling the light emitter to emit the measuring light; and starting the time-counting process and providing the reference signal to a reference signal input terminal of the comparator by the process and control module when the measuring light is emitted.

16. The control method as claimed in claim 11, wherein the step (B) further comprises the steps of:

receiving the reflected light and outputting the sensing signal corresponding to the reflected light by the light receiving system;

comparing the sensing signal with the reference signal and outputting a comparison result signal by the comparator.

17. The control method as claimed in claim 11, wherein the predetermined duration is a time interval that the reference signal is lowered from a predetermined reference value to a predetermined lowest reference value.

18. The control method as claimed in claim 11, wherein the step (C) further comprises stopping the lowering of the reference signal when time exceeds the predetermined duration.

* * * * *